US006822689B1

United States Patent
Nakakuki et al.

(10) Patent No.: US 6,822,689 B1
(45) Date of Patent: Nov. 23, 2004

(54) SOLID-STATE IMAGING APPARATUS

(75) Inventors: Toshio Nakakuki, Gifu (JP);
Tomomichi Nakai, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/512,754

(22) Filed: Feb. 25, 2000

(30) Foreign Application Priority Data

Feb. 26, 1999 (JP) .......................................... 11-050741

(51) Int. Cl.[7] .......................... H04N 5/235; H04N 3/14
(52) U.S. Cl. ...................... 348/364; 348/362; 348/312; 348/296
(58) Field of Search ................................ 348/362, 363, 348/364, 365, 366, 367, 368, 312, 296

(56) References Cited

U.S. PATENT DOCUMENTS

| 5,065,248 | A | * | 11/1991 | Homma ..................... 348/229.1 |
| 5,115,269 | A | | 5/1992 | Masanaga et al. |
| 5,194,960 | A | * | 3/1993 | Ota ............................ 348/362 |
| 5,473,375 | A | * | 12/1995 | Takayama et al. ......... 348/364 |
| 5,510,837 | A | * | 4/1996 | Takei .......................... 348/362 |
| 5,606,392 | A | * | 2/1997 | Tintera et al. .............. 396/161 |
| 5,734,426 | A | | 3/1998 | Dong |
| 5,751,354 | A | * | 5/1998 | Suzuki et al. ............... 348/349 |
| 5,793,422 | A | * | 8/1998 | Mochizuki et al. ......... 348/296 |
| 6,175,384 | B1 | * | 1/2001 | Homma ..................... 348/363 |
| 6,188,434 | B1 | | 2/2001 | Tsuchiya |
| 6,239,840 | B1 | | 5/2001 | Shibuya et al. |
| 6,480,226 | B1 | * | 11/2002 | Takahashi et al. .......... 348/296 |
| 6,486,915 | B2 | * | 11/2002 | Bell et al. ................... 348/362 |

FOREIGN PATENT DOCUMENTS

JP 03101384 4/1991

* cited by examiner

*Primary Examiner*—Andrew Christensen
*Assistant Examiner*—Lin Ye
(74) *Attorney, Agent, or Firm*—Hogan & Hartson, LLP

(57) ABSTRACT

Exposure control for a solid-state imaging apparatus can be completed in a short time. First exposure information D1 and second exposure information D2 are prepared. The first exposure information D1 is for adjustment of an exposure time L for a CCD (1) through extension or reduction in the unit of one horizontal scanning period; the second exposure information D2 is for direct designation of an exposure time L. When the power is switched on, the second exposure information D2 is selected for supply to a timing control circuit (3). After a lapse of a predetermined time, the first exposure information D1 is then selected.

8 Claims, 2 Drawing Sheets

SOLID-STATE IMAGING APPARATUS

BACKGROUND OF THE INVENTION

1. Field of the Invention

The present invention relates to a solid-state imaging apparatus having an exposure control function.

2. Description of the Related Art

FIG. 1 is a block diagram showing a structure of an imaging apparatus using a CCD image sensor. FIG. 2 is a timing chart illustrating operation of the imaging apparatus of FIG. 1.

A CCD image sensor 1 comprises a plurality of light receiving pixels, a plurality of vertical transfer registers, and, generally, one horizontal shift register. The plurality of light receiving pixels are arrayed with constant intervals on a light receiving plane, on which an optical image of an object is formed. Each light receiving pixel generates and accumulates therein information charges corresponding to the formed image. The vertical shift registers, each arranged to correspond to a light receiving pixel column, read information charges accumulated in the respective light receiving pixels for sequential transfer in the vertical direction. The horizontal shift register, arranged on the output side of the vertical shift registers, receives information charges from the plurality of vertical shift registers, and transfers them for every light receiving pixel row, whereby an image signal Y, the voltage value of which differs according to the amount of information charges accumulated in each light receiving pixel, is output.

A driving circuit 2 supplies various transfer clocks to each shift register of the CCD 1 in response to synchronous signals such as VD, HD, supplied from a timing control circuit 3 (described below). For example, in response to a vertical synchronous signal VD, the driving circuit 2 generates a frame transfer clock ØF, and supplies one to vertical shift registers. In response to a clock ØF, information charges accumulated in the plurality of light receiving pixels are taken into the vertical shift registers for every vertical scanning period. In response to a horizontal synchronous signal HD, the driving circuit 2 generates an accumulation transfer clock ØS and a horizontal transfer clock ØH, and supplies ones to the vertical shift registers and the horizontal shift register. In response to these clocks ØS, ØH, the vertical and horizontal shift registers transfer the information charges stored therein, so that information charges in the vertical shift registers are output for every horizontal light receiving row via the horizontal shift register. In response to a shutter timing signal ST supplied from the timing control circuit 3, the driving circuit 2 generates a discharge clock ØD, and supplies one to a drain region of the CCD 1, via which to discharge unnecessary charges. With the above arrangement, information charges accumulated in the light receiving pixels of the CCD 1 can all be discharged to the drain region. The time period from the end of a discharge clock ØD to the beginning of a frame transfer clock ØF, defined as a time L, correspond to a period for information charges to be accumulated in the CCD 1, or an exposure time.

The timing control circuit 3 divides a reference clock of a predetermined cycle to thereby generate a vertical synchronous signal VD for determining a CCD 1 vertical scanning timing, and a horizontal synchronous signal HD for determining a CCD 1 horizontal scanning timing. For example, for the NTSC method, the timing control circuit 3 has a structure for dividing a 14.32 MHz reference clock by 910 to thereby generate a horizontal synchronous signal HD, and for dividing a resultant horizontal synchronous signal HD by 252.5 to thereby generate a vertical synchronous signal.

An integration circuit 4 is reset in response to a vertical synchronous signal VD, and integrates an image signal Y from the CCD 1 for every vertical scanning period to thereby generate integration information I, which is proportional to an average level of the image signal Y. An exposure determination circuit 5 compares, for every vertical scanning period, integration information I received from the integration circuit 4 and upper and lower values of a suitable exposure range, and raises either an exposure suppression signal CL or an exposure promotion signal OP according to the comparison result. Specifically, for integration information I exceeding the upper value, an exposure suppression signal CL is risen, while, for the integration information I not reaching the lower value, an exposure promotion signal OP is risen. An up-down counter 6 stores information of a timing for a shutter timing signal St to rise, by means of the number of a horizontal scanning line. Specifically, the up-down counter 6 is counted up in response to a rise of an exposure suppression signal CL, and counted down in response to a rise of an exposure promotion signal OP. That is, for every vertical scanning period V, a shutter timing signal ST is risen at a time when the number of horizontal scanning periods, the number being designated by the up-down counter 6, have passed. A latch 7 latches a count value of the up-down counter 6 for every vertical scanning period in response to a vertical synchronism signal VD, and supplies the latched value information as exposure information D to the timing control circuit 3.

In a solid-state imaging apparatus of the above structure, the up-down counter 6 is counted up or down for every screen according to the level of an integration value I of an image signal Y. This arrangement allows adjustment of an exposure time L for every vertical scanning period through extension or reduction in unit of one horizontal scanning period.

The above structure for exposure time adjustment, however, requires a certain amount of time before optimum exposure condition is can be attained for a solid-state image sensor when the power is switched on or brightness of the object is abruptly changed. That is, as an exposure time for a CCD 1 is extended or reduced at a predetermined rate for every vertical scanning period, a significant difference between the exposure time at the beginning of exposure control and an optimum exposure time prevents instant adjustment to the optimum exposure time, and might results in a long period being required to complete the exposure control operation. Although adjustment of an exposure time at a larger ratio for every vertical scanning period could hasten and thus complete an exposure control operation in a shorter time, such adjustment would be excessively sensitive to variation of object brightness, which may cause excessive extension or reduction of an exposure time, and resultantly makes unstable exposure control.

SUMMARY OF THE INVENTION

The present invention has been conceived to overcome the above problems and aims to achieve stable exposure control operation that completes in a short time.

Specifically, according to the present invention, there is provided a solid-state imaging apparatus, comprising a solid-state image sensor having a plurality of light receiving elements arrayed thereon, for accumulating in each of the plurality of light receiving elements information charges according to a received object image; a driving circuit for discharging the information charges accumulated in each of the plurality of light receiving elements of the solid-state image sensor, and for outputting, after a predetermined period, information charges accumulated in each of the plurality of light receiving elements whereby an image signal according to the information charges is obtained; first exposure information generating circuit for detecting a level of the image signal in a predetermined cycle to generate first exposure information which is increased or decreased based on a detection result; second exposure information generating circuit for calculating second exposure information based on the level of the image signal; selecting circuit for selecting either the first exposure information or the second exposure information; and timing control circuit for setting discharge timing and output timing to the driving circuit; wherein the selecting circuit selects the second exposure information during a predetermined period, and subsequently selects the first exposure information.

According to the present invention, as an optimum exposure time of a solid-state imaging apparatus is set when second exposure information is selected, exposure control can complete instantly irrespective of the duration of the preceding exposure time. The first exposure information is thereafter selected so that the exposure time for the solid-state imaging apparatus can be adjusted into one for optimum exposure condition for every vertical scanning period through extension or reduction at a predetermined rate.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENT

Figure 3:
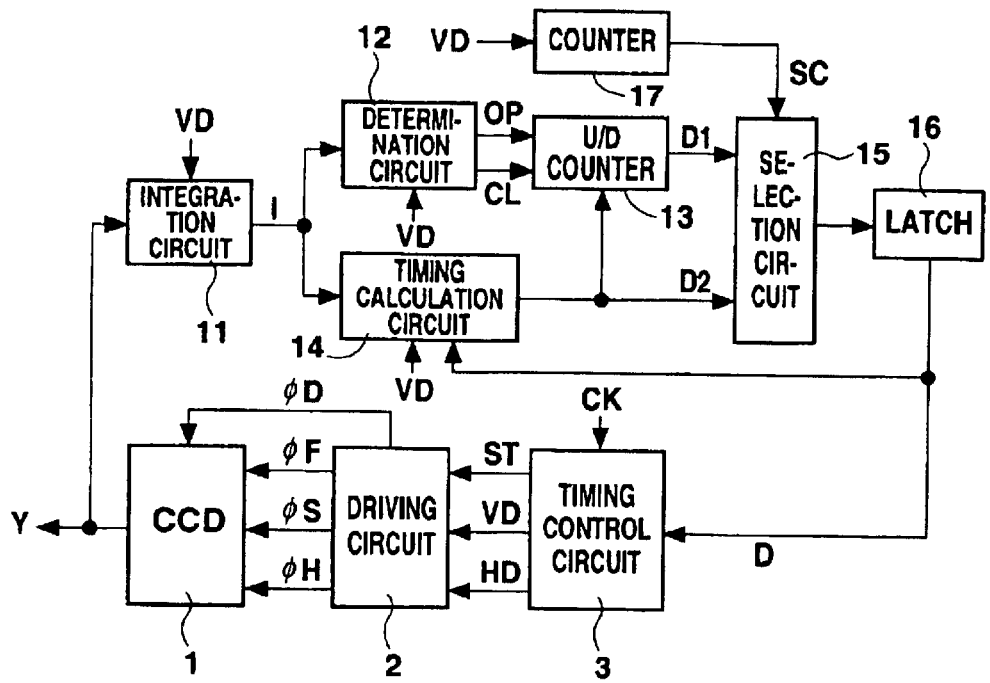
FIG. 3 is a block diagram showing a structure of an imaging apparatus according to the present invention.
Figure 4:
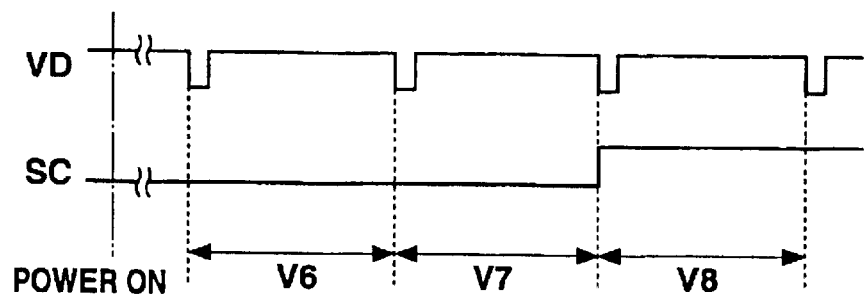
FIG. 4 is a timing chart for explaining operation of the imaging apparatus according to the present invention.

FIG. 3 is a block diagram showing a structure of a solid-state imaging apparatus in a preferred embodiment of the present invention. FIG. 4 is a timing chart illustrating operation of the apparatus of FIG. 3.

Figure 1:
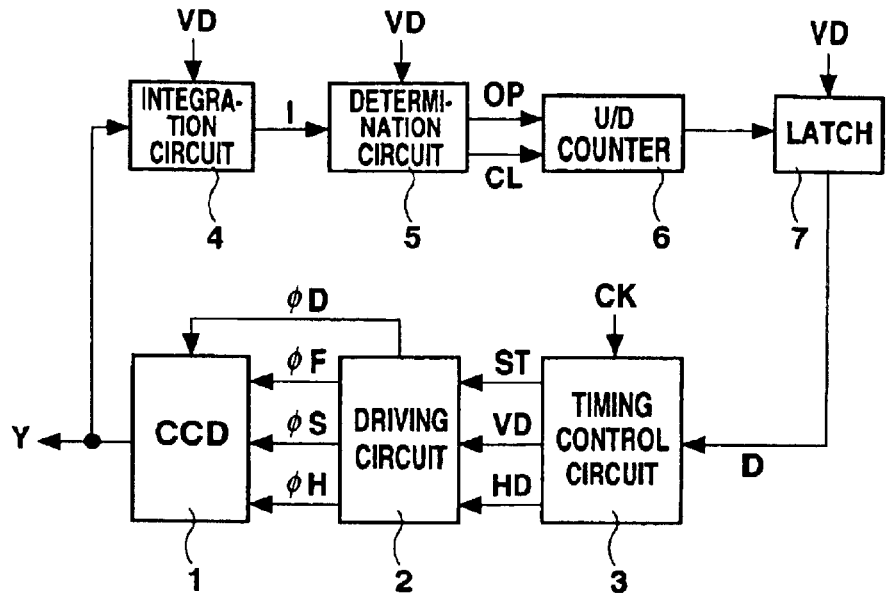
FIG. 1 is a block diagram showing a structure of a conventional imaging apparatus.
Figure 2:
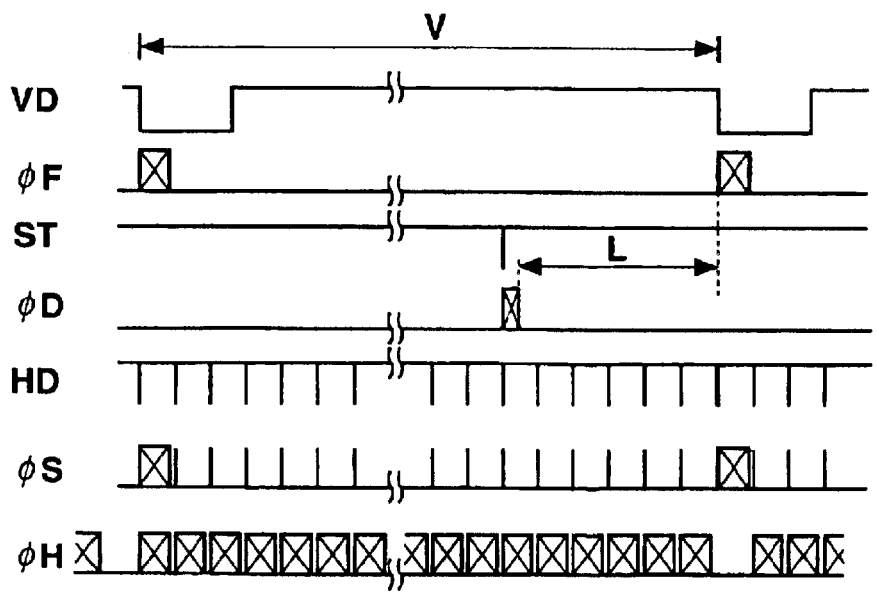
FIG. 2 is a timing chart for explaining operation of the conventional imaging apparatus.

The CCD 1, the driving circuit 2, and the timing control circuit 3 have identical structures as described referring to FIG. 1. That is, the CCD 1 is driven in response to pulses from the driving circuit 2, and outputs an image signal Y, the driving circuit 2 operating in response to an output from the timing control circuit 3.

This solid-state imaging apparatus is characterized in that a first exposure information D1 and a second exposure information D2 are switched between them to be supplied to the timing control circuit 3, a first exposure information D1 is used for stepwise extension or reduction of an exposure time L of the CCD at a predetermined rate, and a second exposure information D2 is used for direct designation of an exposure time L for optimum exposure condition. In this apparatus, the second exposure information D2 is selected and supplied to the timing control circuit 3 at the beginning of operation of the imaging apparatus, and then switched to the first exposure information D1 after a lapse of a predetermined time.

An integration circuit 11, identical to the integration circuit 4 in FIG. 1, integrates an image signal Y supplied from the CCD 1 for every vertical scanning period to thereby generate integration information I, which is proportional to an average level of the image signal Y. An exposure determination circuit 12 compares the integration information I supplied from the integration circuit 11, and upper and lower values of an optimum exposure range, and raises either an exposure suppression signal CL or an exposure promotion signal OP according to the comparison result. That is, the exposure determination circuit 12 rises an exposure suppression signal CL when the integration information I exceeds the upper value, and rises an exposure promotion signal OP when the integration information I does not reach the lower value. An up-down counter 13 is counted up in response to the rise of an exposure suppression signal CL, and counted down in response to the rise of an exposure promotion signal OP, so that first exposure information D1 for designating a timing for a shutter timing signal ST to rise, by means of the number of a horizontal scanning line, is output. After the counter 17 is reset, second exposure information D2, prepared in the timing calculation circuit 14, is set to the up-down counter 13 for initialization. Note that first exposure information D1 is updated for every vertical scanning period, and the value of the information D1 is increased or decreased at a predetermined rate for every vertical scanning period whereby an exposure time L for the CCD 1 is extended or reduced by a predetermined time period for every vertical scanning period. The determination circuit 12 and the up-down counter 13 together constitute a first exposure information generation circuit.

The timing calculation circuit 14 holds exposure information D corresponding to the current exposure time L for the CCD 1, and calculates second exposure information D2 for designating an optimum exposure time, based on an integration value I relative to the held exposure information D, and an optimum value R0, which is set corresponding to optimum exposure condition. That is, second exposure information D2 for designating an optimum exposure time is calculated as $$D2 = R0 \cdot D/I$$

The second exposure information D2 is calculated in response to specification of an integration value I and exposure information D indicative of then exposure time L, for direct designation of a timing for a shutter timing signal ST to rise. The timing calculation circuit 14 constitutes a second exposure information generation circuit.

The selection circuit 15, which is connected to the up-down counter 13 and the timing calculation circuit 14, selects either first exposure information D1 or second exposure information D2 in response to a switch control signal SC. The counter 17, which is reset in response to activation of the imaging apparatus or a trigger automatically or manually input at a desired timing, counts vertical synchronous signals VD. When the count value reaches a predetermined value, a switch control signal SC for reversing the condition, is output. Specifically, the counter 17 may be of 14 bits, and the uppermost bit of a count output is used as a switch control signal SC. With this arrangement, a switch control signal SC is maintained at L-level after resetting of the counter 17 and in the following eight vertical scanning periods V0 to V7, during which period second exposure information D2 is selected. During a subsequent vertical scanning period V8 and thereafter, the switch control signal SC is risen to H level so that first exposure information D1 is selected. A latch 16 latches exposure information D1/D2 having selectively output from the selection circuit 15, at a timing according to a vertical synchronous signal VD, and supplies the information as exposure information D to the timing control circuit 3 and the timing calculation circuit 14.

With the above imaging apparatus, in response to resetting of the counter when, for example, the power is switched on and so on, second exposure information, generated by the timing calculation circuit 14, is supplied to the up-down counter 13 as well as to the timing control circuit 3. With this arrangement, an exposure time for the CCD 1 can be determined instantly at an optimum duration, and the up-down counter 13 is accordingly set to have a counter value corresponding to the duration. Then, such exposure control is repeated during a predetermined time to stabilize operation of the respective sections before the second exposure information D2 is switched to first exposure information D1 in response to a rise of a switch control signal SC.

As an alternative, the counter 17 may be reset in response to a trigger supplied in response to a switch which is operated by an operator of the imaging apparatus, differing from a power-on reset as described above.

As described above, the present invention enables instant completion of exposure control, even immediately after the power being switched on or when object brightness is varied significantly. Stable exposure control is thereby ensured.

What is claimed is:

1. A solid-state imaging apparatus, comprising:
   a solid-state image sensor having a plurality of light receiving elements arrayed thereon, for accumulating in each of the plurality of light receiving elements information charges according to a received object image;
   a driving circuit for discharging the information charges accumulated in each of the plurality of light receiving elements of the solid-state image sensor for every vertical scanning period, and for outputting, after a predetermined period, information charges accumulated in each of the plurality of light receiving elements whereby an image signal according to the information charges is obtained;
   first exposure information generating circuit for detecting a level of the image signal in a predetermined cycle to generate first exposure information which is increased or decreased based on a detection result;
   second exposure information generating circuit for calculating second exposure information based on the current level of the image signal;
   selecting circuit for selecting either the first exposure information or the second exposure information; and
   timing control circuit for setting discharge timing and output timing to the driving circuit;
   wherein
   the first exposure information generating circuit generates the first exposure information based on the second exposure information during a predetermined period, and
   the selection circuit selects the second exposure information during the predetermined period, and subsequently selects the first exposure information.

2. A solid-state imaging apparatus according to claim 1, wherein the selection circuit continuously selects the second exposure information during a predetermined period in response to rise of power.

3. A solid-state imaging apparatus according to claim 1, wherein the selecting circuit continuously selects the second exposure information during a predetermined period in response to a trigger given at a desired timing.

4. A solid-state imaging apparatus, comprising:
   a solid-state image sensor having a plurality of light receiving elements arrayed thereon, for accumulating in each of the plurality of light receiving elements information charges according to a received object image;
   a driving circuit for discharging the information charges accumulated in each of the plurality of light receiving elements of the solid-state image sensor for every vertical scanning period, and for subsequently resuming accumulation of the information charges in each of the plurality of light receiving elements to read, after a period according to exposure information, the information charges accumulated whereby an image signal according to the information charges is obtained;
   a level detection circuit for detecting a brightness level of an image based on the image signal;
   first exposure information generating circuit for comparing the brightness level and a predetermined brightness reference value according to suitable exposure condition to generate first exposure information which is increased or decreased based on a comparison result;
   second exposure information generating circuit for calculating second exposure information according to a predetermined target brightness level based on a current brightness level and current exposure information;
   selecting circuit for selecting either the first exposure information of the second exposure information; and
   timing control circuit for setting a discharge timing and a read timing for the information charges to be discharged and read from the driving circuit, respectively;
   wherein
   the first exposure information generating circuit generates the first exposure information based on the second exposure information during a predetermined period, and
   the selection circuit selects the second exposure information during the predetermined period, and subsequently selects the first exposure information.

5. A solid-state imaging apparatus according to claim 4, wherein the selection circuit continuously selects the second exposure information during a predetermined period in response to rise of power.

6. A solid-state imaging apparatus according to claim 4, wherein the selecting circuit continuously selects the second exposure information during a predetermined period in response to a trigger given at a desired timing.

7. A solid-state imaging apparatus according to claim 4, wherein the second exposure information generating circuit continuously generates the second exposure information for every vertical scanning period during at least the predetermined period.

8. A solid-state imaging apparatus according to claim 4, wherein the first exposed information generating circuit updates the first exposure information every vertical scanning period.

* * * * *